US012633024B2

(12) United States Patent
Pan et al.

(10) Patent No.: US 12,633,024 B2
(45) Date of Patent: May 19, 2026

(54) EFFECT PROCESSING METHOD AND APPARATUS

(71) Applicant: Beijing Bytedance Network Technology Co., Ltd., Beijing (CN)

(72) Inventors: Jiali Pan, Beijing (CN); Yi Guo, Beijing (CN); Xiaole Xue, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 169 days.

(21) Appl. No.: 18/567,654

(22) PCT Filed: Sep. 21, 2022

(86) PCT No.: PCT/CN2022/120335
§ 371 (c)(1),
(2) Date: Dec. 6, 2023

(87) PCT Pub. No.: WO2023/065947
PCT Pub. Date: Apr. 27, 2023

(65) Prior Publication Data
US 2024/0282029 A1      Aug. 22, 2024

(30) Foreign Application Priority Data
Oct. 18, 2021     (CN) .......................... 202111209138.9

(51) Int. Cl.
*G06T 13/00*          (2011.01)
*G06T 13/80*          (2011.01)
*G06T 13/60*          (2011.01)

(52) U.S. Cl.
CPC .............. *G06T 13/00* (2013.01); *G06T 13/80* (2013.01); *G06T 13/60* (2013.01); *G06T 2210/56* (2013.01)

(58) Field of Classification Search
CPC ......... G06T 13/00; G06T 13/60; G06T 13/80; G06T 2210/56; G06T 11/00
See application file for complete search history.

(56) References Cited

U.S. PATENT DOCUMENTS

2007/0159049 A1      7/2007   Kim et al.
2008/0063236 A1      3/2008   Ikenoue et al.
(Continued)

FOREIGN PATENT DOCUMENTS

CN          101071504 A        11/2007
CN          105975273 A         9/2016
(Continued)

OTHER PUBLICATIONS

S. Zhang, "Fireworks Simulation Based on Particle System," 2009 Second International Conference on Information and Computing Science, Manchester, UK, 2009, pp. 187-190, doi: 10.1109/ICIC. 2009.54. (Year: 2009).*
(Continued)

*Primary Examiner* — Alicia M Harrington
*Assistant Examiner* — Christine Yera Ahn
(74) *Attorney, Agent, or Firm* — Alleman Hall LLP

(57) ABSTRACT

Embodiments of the present disclosure provide an effect processing method and apparatus, an electronic device, a computer readable storage medium, a computer program, and a computer program product. The method comprises: during processing of a first particle, writing a particle identifier of a first particle into at least one first list of events; obtaining an effect screen by processing a corresponding second particle according to each first list of events, wherein the second particle has an association relationship with the first particle in the first list of events, association relationships corresponding to different first lists of events are different, and the particles are display objects of geometries.
(Continued)

S101

During processing a first particle, write particle identifier of the first particle into at least one first event list

S102

Obtain an effect screen by processing a corresponding second particle according to each first event list, wherein the first particle in the first event list and the second particle are particles having an association relationship, different first event lists correspond to different association relationships, and the particles are display objects of geometric shapes In embodiments of the present disclosure, an association relationship between particles may be established through at least one first list of events.

20 Claims, 4 Drawing Sheets

(56) References Cited

U.S. PATENT DOCUMENTS

| | | | | |
|---|---|---|---|---|
| 2012/0249557 A1* | 10/2012 | Ferguson | | G06T 13/00 |
| | | | | 345/473 |
| 2014/0125669 A1 | 5/2014 | Kilgariff et al. | | |
| 2015/0109309 A1* | 4/2015 | Mueller-Fischer | | G06T 13/20 |
| | | | | 345/473 |
| 2015/0161810 A1* | 6/2015 | Macklin | | G06T 13/60 |
| | | | | 345/474 |
| 2018/0082460 A1* | 3/2018 | Xing | | G06T 13/80 |

FOREIGN PATENT DOCUMENTS

| | | |
|---|---|---|
| CN | 110930487 A | 3/2020 |
| CN | 111292399 A | 6/2020 |
| CN | 111367605 A | 7/2020 |
| CN | 111563963 A | 8/2020 |
| CN | 112215932 A | 1/2021 |
| CN | 112446942 A | 3/2021 |
| CN | 112529997 A | 3/2021 |
| CN | 112700517 A | 4/2021 |
| JP | 2011076620 A | 4/2011 |

OTHER PUBLICATIONS

China National Intellectual Property Administration, International Search Report and Written Opinion for International Application No. PCT/CN2022/120347, mailed Oct. 27, 2022, 16 Pages.

International Preliminary Report on Patentability for International Application No. PCT/CN2022/119408, mailed May 2, 2024, 6 pages.

International Preliminary Report on Patentability for International Application No. PCT/CN2022/120335, mailed May 2, 2024, 5 pages.

International Preliminary Report on Patentability for International Application No. PCT/CN2022/120347, mailed May 2, 2024, 6 pages.

ISA China National Intellectual Property Administration, , International Search Report and Written Opinion Issued for International Application No. PCT/CN2022/119408, mailed Nov. 18, 2022, 14 Pages.

ISA Intellectual Property Office of Singapore, International Search Report and Written Opinion for International Application No. PCT/SG2022/050685, mailed May 2, 2023, 16 Pages.

ISA China National Intellectual Property Administration, International Search Report Issued in Application No. PCT/CN2022/120335, Dec. 2, 2022, WIPO, 9 pages.

* cited by examiner

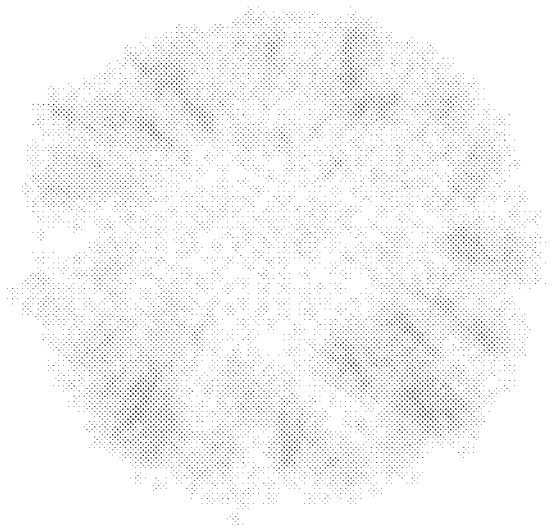

FIG. 1

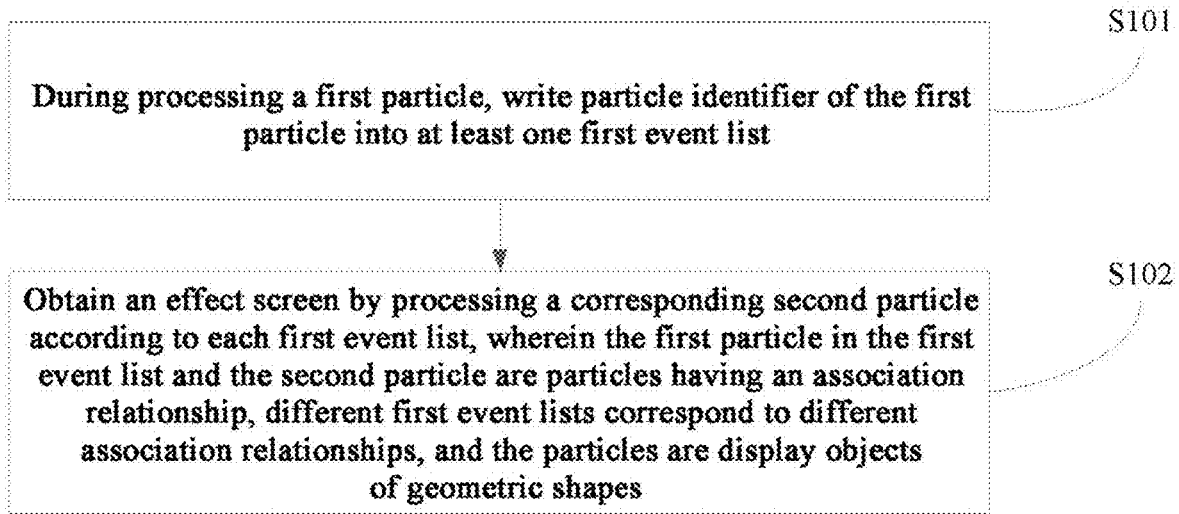

S101

During processing a first particle, write particle identifier of the first
particle into at least one first event list

S102

Obtain an effect screen by processing a corresponding second particle
according to each first event list, wherein the first particle in the first
event list and the second particle are particles having an association
relationship, different first event lists correspond to different
association relationships, and the particles are display objects
of geometric shapes

FIG. 2

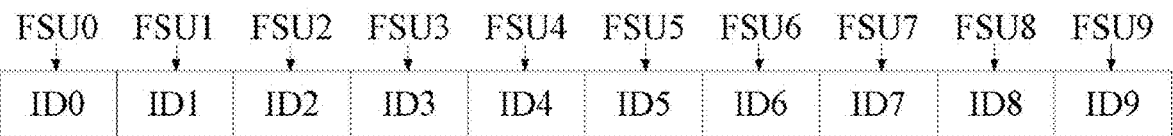
| FSU0 | FSU1 | FSU2 | FSU3 | FSU4 | FSU5 | FSU6 | FSU7 | FSU8 | FSU9 |
|------|------|------|------|------|------|------|------|------|------|
| ID0 | ID1 | ID2 | ID3 | ID4 | ID5 | ID6 | ID7 | ID8 | ID9 |
FIG. 3
| SSU0 | SSU1 | SSU2 | SSU3 | SSU4 | SSU5 | SSU6 | SSU7 | SSU8 | SSU9 |
|------|------|------|------|------|------|------|------|------|------|
| AC0 | AC1 | AC2 | AC3 | AC4 | AC5 | AC6 | AC7 | AC8 | AC9 |
FIG. 4
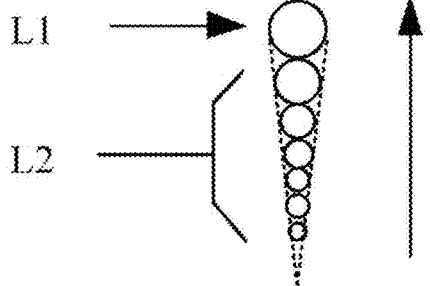
L1
L2
FIG. 5

EFFECT PROCESSING METHOD AND APPARATUS

CROSS REFERENCE TO RELATED APPLICATIONS

The present disclosure is a national stage application filed under 35 U.S.C. 371 based on International Patent Application No. PCT/CN2022/120335, filed on Sep. 21, 2022, which claims a priority right to the Chinese patent application No. 202111209138.9 entitled "Effect Processing Method and Apparatus" filed on Oct. 18, 2021. The full disclosures of these applications are incorporated in the present application by reference.

FIELD

Embodiments of the present disclosure relate to the field of computer processing technologies, and particularly to an effect processing method and apparatus, an electronic device, a computer readable storage medium, a computer program, and a computer program product.

BACKGROUND

An effect screen refers to a picture with a special visual effect added to an image, video, text, etc. A typical effect screen may be made up of a large number of particles, each particle being a unit in an arbitrary shape. Each particle is independent and moving and changing constantly. The movement is regular or irregular, and the change may be a change in color, transparency, size, etc. For example, a fireworks effect may be simulated by a large number of particles. An upward movement of a large number of particles may simulate the rising of fireworks, each particle disappears after rising to a certain height and meanwhile more particles are displayed at the disappearing position of the particle to simulate an explosion effect of fireworks.

It can be seen that the process of generating the above-mentioned effect screen may be a process of generating particles, updating particles and rendering particles. The more diversified the number of particles, the colors of particles, the size of particles, the relationship between particles, etc. included in an effect screen, the better the richness of the effect screen. Therefore, how to improve the richness of the effect screen becomes an urgent problem to be solved.

SUMMARY

The present disclosure provides an effect processing method and apparatus, an electronic device, a computer readable storage medium, a computer program, and a computer program product, which may improve the richness of the effect screen.

In a first aspect, embodiments of the present disclosure provide an effect processing method comprising:

during processing of a first particle, writing a particle identifier of a first particle into at least one first list of events;

obtaining an effect screen by processing a corresponding second particle according to each first list of events, wherein the second particle has an association relationship with the first particle in the first list of events, association relationships corresponding to different first lists of events are different, and the particles are display objects of geometries.

In a second aspect, embodiments of the present disclosure provide an effect processing apparatus, comprising:

a particle identifier writing module configured to, during processing of a first particle, write particle identifier of the first particle into at least one first list of events;

a second particle processing module configured to obtain an effect screen by processing a corresponding second particle according to each first list of events, wherein the second particle has an association relationship with the first particle in the first list of events, association relationships corresponding to different first lists of events are different, and the particles are display objects of geometries.

In a third aspect, embodiments of the present disclosure provide an electronic device comprising: at least one processor and a memory;

the memory storing computer-executable instructions;

the at least one processor executing the computer-executable instructions stored in the memory, to cause the electronic device to implement the method according to the first aspect.

In a fourth aspect, embodiments of the present disclosure provide a computer-readable storage medium, wherein the computer-readable storage medium stores computer-executable instructions therein, the computer-executable instructions, when executed by a processor, causing a computing device to implement the method according to the first aspect.

In a fifth aspect, embodiments of the present disclosure provide a computer program for implementing the method according to the first aspect.

In a sixth aspect, embodiments of the present disclosure provide a computer program product comprising a computer program which, when executed by a processor, implements the method according to the first aspect.

Embodiments of the present disclosure provide an effect processing method and apparatus, an electronic device, a computer readable storage medium, a computer program, and a computer program product. The method comprises: during processing of a first particle, writing a particle identifier of a first particle into at least one first list of events; obtaining an effect screen by processing a corresponding second particle according to each first list of events, wherein the second particle has an association relationship with the first particle in the first list of events, association relationships corresponding to different first lists of events are different, and the particles are display objects of geometries. In embodiments of the present disclosure, an association relationship between particles may be established through the at least one first list of events.

BRIEF DESCRIPTION OF THE DRAWINGS

Figures to be used in the depictions of embodiments will be introduced briefly in order to illustrate technical solutions of embodiments of the present disclosure more clearly. It is obvious that the figures in the following depictions are merely some embodiments described in the present disclosure, and those skilled in the art man further obtain other figures according to these figures without making any inventive efforts.

FIG. 1 is a schematic view showing a specific effect picture of simulating an explosion effect of fireworks by particles;

FIG. 2 illustrates a flow chart of steps of an effect processing method provided by an embodiment of the present disclosure;

FIG. 3 is a structural schematic diagram of a list of events provided by an embodiment of the present disclosure;

FIG. 4 is a structural diagram of a list of preset attributes provided by an embodiment of the present disclosure;

FIG. 5 is a schematic diagram of a positional relationship between first particles and second particles provided by an embodiment of the present disclosure;

DETAILED DESCRIPTION OF EMBODIMENTS

Figure 6:
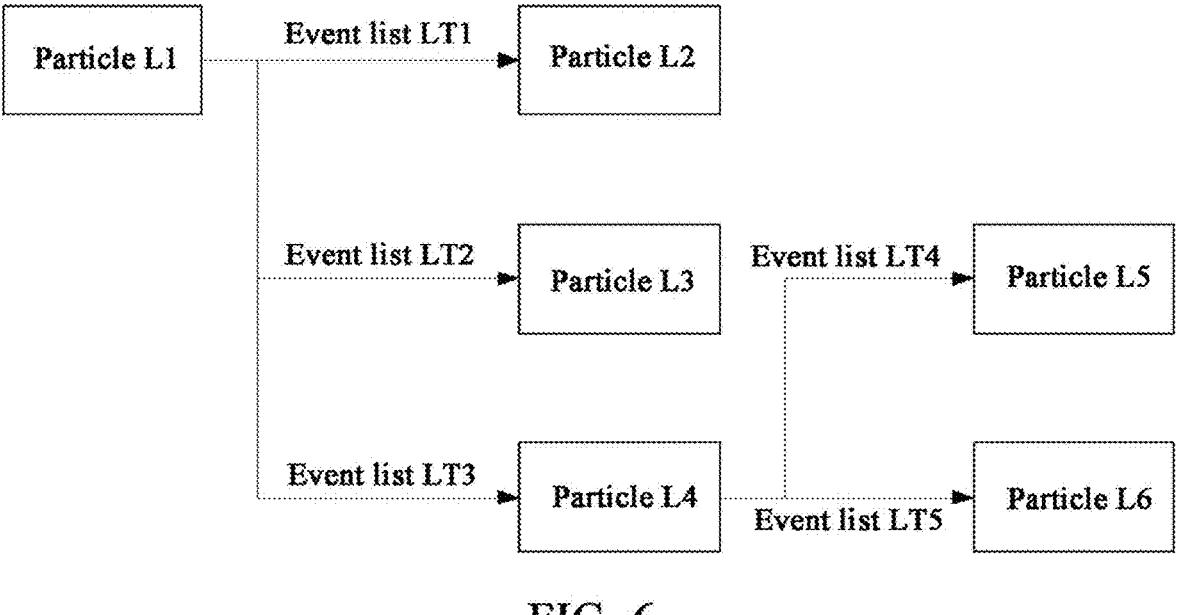
FIG. 6 is a schematic diagram of an association relationship between particles having a hierarchy provided by an embodiment of the present disclosure.

To make objectives, technical solutions and advantages of embodiments of the present disclosure more apparent, the technical solutions in embodiments in the disclosure will be described below clearly and completely with reference to figures in the embodiments of the disclosure. Obviously, the described embodiments are only partial embodiments in the disclosure rather than all embodiments. All other embodiments obtained by those skilled in the art without making inventive efforts based on the embodiments in the disclosure should fall within the scope of protection of the present disclosure.

Embodiments of the present disclosure may be applied to a process of simulating an effect screen by particles. FIG. 1 is a schematic view showing a specific effect picture of simulating an explosion effect of fireworks by particles, wherein one particle may be constituted by one or more adjacent pixel points. Certainly, the effects picture that may be simulated by particles may include, but is not limited to: a cloud and fog effect, a volcanic explosion effect and a flame effect.

The above-mentioned effect screen may be implemented and performed by an electronic device provided with a processor that may perform a lot of computing and a screen that may display particles. The processor may be a Central Processing Unit (CPU) or a Graphics Processing Unit (GPU).

Since the effect screen is formed by the movement of a large number of particles, the processor is required to have a powerful computing capability. As compared with the CPU, the GPU has a better parallel computing capability, so the computing performance of particles may be improved effectively by using the GPU to simulate the effect screen.

In the prior art, when the effect screen is simulated by the GPU, attributes of the particle is updated in a fixed manner, thereby causing a poor diversity of the effect screen.

To address the above-described problem, in embodiments of the present disclosure, an association relationship between particles may be established through at least one first list of events. Since association relationships corresponding to different first lists of events are different, at least one type of second particles may be generated based on one type of first particles, so that the effect screen comprises multiple types of second particles based on the first particles. Thus, the richness of the effect screen is improved.

The technical solutions of the embodiments of the present disclosure and how the technical solutions of the present disclosure solve the above-mentioned technical problems will be described in detail in the following specific embodiments. The following specific embodiments may be combined with one another, and the same or similar concepts or processes might not be repeated in some embodiments. Embodiments of the present disclosure will now be described with reference to the accompanying drawings.

FIG. 2 illustrates a flow chart of steps of an effect processing method provided by an embodiment of the present disclosure. The method shown in FIG. 2 may be applied to an electronic device. Referring to FIG. 2, the effect processing method comprises:

S101: during processing of a first particle, a particle identifier of a first particle is written into at least one first list of events.

In an embodiment of the present disclosure, processing the particles comprises: generating the particle, updating attributes of the particle, and rendering the particle according to the attributes of the particle.

When the particle is generated, the attributes of the particle need to be initialized, and the attributes of the particle is stored in a separate memory. The attributes of the particle includes, but are not limited to: a position, a color, a movement direction, a speed, a current display duration, a maximum display duration and a size.

The current display duration refers to a duration in which the particle exists, and increases progressively along with the elapse of time after the particle is generated. The maximum display time is used to limit the display duration of the particle. The current display duration and the maximum display duration determine whether to display the state of the particle. When the current display duration of the particle reaches the maximum display duration, the particle is no longer displayed, which indicates that the particle is in a display-stopped state; when the current display duration of the particle does not reach the maximum display duration, the particle continues to be displayed, which indicates that the particle is in an active state.

When the particle is initialized, the position, color, movement direction, speed, maximum display duration and size of the particle may all be set according to actual needs, and the current display duration needs to be set as 0. The initial attributes of the particle may also be specified in effect resource data.

Updating the attributes of the particle may include, but not limited to: updating the position, speed, color, movement direction, size, etc. of the particle.

It needs to be appreciated that each time the particle is updated, the particle need to be rendered to display the particle on the screen. In this way, visual particle movement is achieved. In embodiments of the present disclosure, the particle may be rendered using a vertex/pixel shader.

The particle may have a geometry constituted by at least one pixel point. Thus, upon rendering the particle, the vertex/pixel shader may render the particle according to the geometry. The geometry may include, but not limited to: points, lines, faces and cubes. The faces may be squares, triangles, strips, meshes, etc. The embodiments of the present disclosure do not limit the geometry of the particle.

In the above processing procedure of the first particle, the first particle may be written into the first list of events, wherein the first list of events is a list of events storing the first particle.

FIG. 3 is a structural schematic diagram of a list of events provided by an embodiment of the present disclosure. Referring to FIG. 3, the list of events comprises ten first storage units FSU0 to FSU9 storing then particle identifiers ID0 to ID9 of the first particle, respectively. These particle identifiers are usually written in a chronological order.

Optionally, before writing the particle identifiers of the first particle to the first list of events, it is also necessary to determine whether to write the particle identifiers of the first particle according to a preset condition. If the preset condition is met, the particle identifiers of the first particle are written into the first list of events; if the preset condition is not met, the particle identifiers of the first particle are not written into the first list of events.

The preset condition may be a condition for the first particle, or may be a condition for remaining information.

The condition for the first particle may be that an attribute of the first particle meets a preset attribute condition. The attribute may be any attribute of the first particle. Specifically, the attribute of the first particle meeting the preset attribute condition comprises at least one of: a current display duration of the first particle reaching a maximum display duration of the first particle, a position of the first particle reaching a target position, a speed of the first particle reaching a target speed, color of the first particle being target color, or a size of the first particle reaching a target size.

Wherein the current display duration of the first particle reaching the maximum display duration of the first particle means that the first particle is in a display-stopped state and the first particle is no longer displayed. Thus, an effect of displaying the second particle after the displaying of the first particle is stopped is achieved.

The target speed may be zero, i.e., the second particle is displayed when the first particle is no longer moving.

The condition for the remaining information may be that the current time has reached a preset time period. That is, the second particle is periodically displayed according to the first particle.

S102: obtaining an effect screen by processing a corresponding second particle according to each first list of events, wherein the second particle has an association relationship with the first particle in the first list of events, association relationships corresponding to different first lists of events are different, and the particles are display objects of geometries. Since association relationships corresponding to different first lists of events are different, at least one type of second particles may be generated based on one type of first particles, so that the effect screen comprises multiple types of second particles based on the first particles. Thus, the richness of the effect screen is improved.

The display objects are displayed on one or more pixel points, the pixel points constitute the geometry, and positions, coolers, brightness etc. of the pixel points may change over time.

Specifically, when the first list of events is created, the second particle corresponding to the first list of events may be determined. In turn, the first list of events determines an association between the first particle and the second particle because the particle identifiers of the first particle in the first list of events determine an association relationship between the first list of events and the first particle.

The above association relationship is used to control the logic of displaying the second particle according to the first particle; if the association relationship is different, the logic of displaying the second particle is different.

The association relationship comprises: an association relationship between a second attribute of the second particle and a first attribute of the first particle, the second attributes corresponding to different first lists of events are different, and/or the first attributes corresponding to different first lists of events are different.

The second attribute is any attribute of the second particle, the first attribute is any attribute of the first particle, the first attribute and the second attribute may be the same or different, the first attribute may comprise one or more first attributes, and the second attribute may also comprise one or more second attributes. For example, the first attribute and the second attribute may both be a position, such that the position of the second particle is associated with the position of the first particle. As another example, the first attribute may be a position and the second attribute may be a size, such that the size of the second particle is associated with the position of the first particle. As another example, the first attribute may be a position and the second attribute may be a position and a size such that both the size and the position of the second particle are associated with the position of the first particle, thereby enabling a richer effect screen.

A process of processing the second particle for each first list of events is described in detail below.

When the first attribute and the second attribute are both a position, obtaining an effect screen by processing a corresponding second particle according to each first list of events may comprise the following: first, reading a particle identifier of the first particle from the first list of events; then, obtaining the effect screen by determining a position of the first particle according to the particle identifier of the first particle and displaying the second particle after the position of the first particle during a movement of the first particle.

The position of the first particle belong to the attributes of the first particle, and the attributes of the first particle may be stored in a preset attribute list. FIG. 4 is a structural schematic diagram of a list of preset attributes provided by an embodiment of the present disclosure. Corresponding to the ten first storage units included in the list of events shown in FIG. 3, a list of preset attributes shown in FIG. 4 comprise ten second storage units SSU0 to SSU9 storing then attributes of the first particle, respectively: AC0 to AC9 are attributes of the first particle corresponding to ID0 to ID9, respectively.

It needs to be appreciated that each first particle described above corresponds to one or more attributes which constitute a set of attributes of the first particle, so that each of the second storage units in FIG. 4 stores a set of attributes of the first particle.

The position of the first particle may be determined based on the first list of events and the list of preset attributes. Specifically, first, the particle identifiers of the first particle are read from the first list of events; then a set of attributes corresponding to the particle identifiers is acquired from the list of preset attributes; finally, the position of the first particle is extracted from the set of attributes, and a plurality of attributes in the set of attributes are usually arranged in an inherent order.

After the position of the first particle is obtained, the second particle may be displayed after the position of the first particle. A position after the position of the first particle is determined relative to the movement direction of the first particle: a direction opposite to the movement direction of the first particle is a position after the position of the first particle.

FIG. 5 is a schematic diagram of a positional relationship between a first particle and a second particle provided by an embodiment of the present disclosure. Referring to FIG. 5, L1 represents the first particle, and L2 represents second particles; L1 moves upward, and L2 is located after the position of L1 with the direction of upward movement being taken as a reference.

It can be seen that the L2 comprises a plurality of second particles and decreases in size as the distance from the first particle increases, thereby visually forming a trailing effect of the first particle in the ascending process.

It needs to be appreciated that since L1 is moving, L2 is also moving, and L2 and L1 share the same movement trajectory to maintain the relative positional relationship between L1 and L2 in FIG. 5.

To further enhance the real feeling of the tailing effect, the second particle may be perturbed to simulate the perturbation of the fireworks caused by an airflow. That is, the relative position between the second particle and the first particle change over time by a change amount that is less than or equal to a first threshold.

The relative position of the first particle and the second particle changes in a horizontal direction to simulate an effect exerted by wind blowing the fireworks. Certainly, the first threshold is a very small value, thereby ensuring that the change amount is very small so that the relative position between the first particle and the second particle is substantially stable.

When the first attribute comprises the current display duration, the maximum display duration and the position, and the second attribute comprises the position, processing a corresponding second particle according to each first list of events to obtain the effect screen may comprise the following: first, reading a particle identifier of the first particle from the first list of events; then, determining the current display duration, the maximum display duration and the position of the first particle according to the particle identifier of the first particle; finally, displaying at least one second particle around the position of the first particle in the case that the current display time of the first particle is larger than the maximum display duration of the first particle.

The current display duration, the maximum display duration and the position of the first particle are all attributes of the first particle, and the attributes of the first particle may be stored in the list of preset attributes as shown in FIG. 4. Reference may be made to the above detailed depictions of the process of acquiring the position of the first particle for a process of acquiring the current display duration, the maximum display duration and the position of the first particle. Detailed depictions will not be presented any more here.

When the current display duration of the first particle is longer than the maximum display duration of the first particle, the first particle is in the display-stopped state, and the first particle is no longer displayed. At this time, the position of the first particle represents a dissipation position of the first particle, that is, the position where the first particle is displayed the last time. A number of second particles may be displayed around the dissipation position such that the second particles simulate an explosive effect of the first particle.

Optionally, the at least one second particle forms a target shape, a position of the first particle being last displayed is a central position of the target shape, a size of the target shape gradually increases, and the at least one second particle is no longer displayed in the case that the size of the target shape increases to a target size.

That is, the explosion effect of the first particle is exploding around the first particle.

When the at least one second particle is no longer displayed, the explosion is completed. Specifically, the second particles may gradually dissipate until they are no longer displayed.

Optionally, the maximum display duration of all of the aforementioned second particles is less than or equal to a second threshold. Thus, when the current display duration of the second particle reaches the maximum display duration, they are no longer displayed. That is, the second particle is not displayed any longer after it is displayed for a very short time.

Optionally, during processing the second particle, the particle identifiers of the second particle may also be added to at least one remaining list of events to process a corresponding particle in a remaining list of events.

The corresponding particle in a remaining list of events may be referred to as a remaining particle. In an embodiment of the present disclosure, an association relationship between the second particle and the remaining particle through a remaining list of events to process the remaining particle according to the remaining list of events. Reference may be made to the association relationship between the first particle and the second particle for the association relationship between the second particle and the remaining particle. Reference may be made to S101 and S102 for the processing of the remaining particle according to the remaining list of events.

It is notated that the particle being processed may be added to a new list of events in the manner described above to process the new particle according to the new list of events. This means establishing an association relationship between particles having a hierarchy via a plurality lists of events.

FIG. 6 is a schematic diagram of an association relationship between particles having a hierarchy according to an embodiment of the present disclosure. Referring to FIG. 6, there are six sets of particles: L1 to L6, each set of particles comprising one or more particles. The following steps may be specifically performed to generate the association relationship shown in FIG. 6:

S1: during the processing of the particles L1, the particle identifiers of L1 are respectively written into the lists of events LT1, LT2 and LT3 so as to process L2 according to LT1, process L3 according to LT2 and process L4 according to LT3.

S2: during the processing of L4, the particle identifiers of L4 are written into the lists of events LT4 and LT5 to process L5 according to LT4 and process L6 according to LT5.

It can be seen that the above-mentioned first-level association relationship may comprise the following three association relationships: an association relationship between L1 and L2, an association relationship between L1 and L3, and an association relationship between L1 and L4. The second-level association relationship may include the following two association relationships: an association relationship between L4 and L5, and an association relationship between L4 and L6.

When the particle identifiers of the particles L1 are added to different lists of events, preset conditions met by the particles L1 may be different, and likewise, when the particle identifiers of the particles L4 are added to different lists of events, the preset conditions met by the particles L4 may be different. For example, when the particles L1 are added to the list of events LT1, the preset condition met may be that the current time reaches a preset time period. When the particles L1 are added to the lists of events LT2 and LT3, the preset condition that is met may be that the current display duration of L1 is greater than the maximum display duration of L1. When the particles L4 are added to the list of events LT4, the preset condition that is met may be that the current time reaches a preset time period. When the particles L4 are added the list of events LT5, the preset condition that is met may be that the current display duration of L4 is greater than the maximum display duration of L4.

According to the detailed description in S102, the lists of events correspond to different particles are different. For example, the list of events LT1 is used to display particles L2 simulating the trailing effect of L1, the lists of events LT2 and LT3 are used to display particles L3 and L4 simulating the explosion effect of L1, but the explosion effects simulated by L3 and L4 are different, the list of events LT4 is used to display particles L5 simulating the trailing effect of L4, and the list of events L5 is used to display particles L6 simulating the explosion effect of L4.

It can be seen from the above-mentioned particles that in the effect screen provided by the embodiments of the present disclosure, firstly, L1 rises with a trailing tail; then, when the displaying of L1 is stopped, the explosion effect of L1 is displayed; the firework after the explosion of L1 has a trailing effect, and explodes for a second time. In this way, a richer effect screen is achieved.

Figure 7:
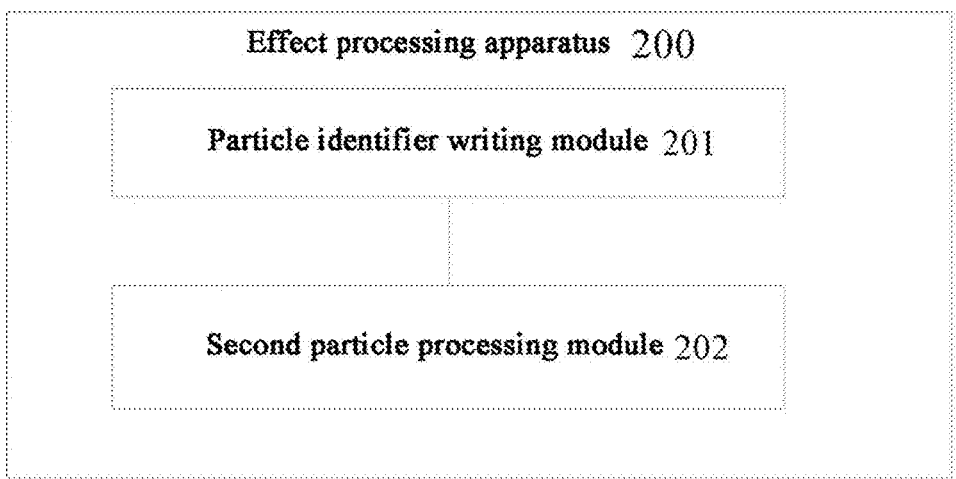
FIG. 7 is a block diagram of a specific processing apparatus according to an embodiment of the present disclosure.

Corresponding to the effect processing method of the above embodiment, FIG. 7 is a block diagram of an effect processing apparatus provided by an embodiment of the present disclosure. For ease of illustration, FIG. 7 only shows the portions related to the present embodiment of the present disclosure. With reference to FIG. 7, the effect processing apparatus 200 comprises: a particle identifier writing module 201 and a second particle processing module 202.

The particle identifier writing module 201 is configured to, during processing of a first particle, write particle identifier of the first particle into at least one first list of events.

The second particle processing module 202 is configured to obtain an effect screen by processing a corresponding second particle according to each first list of events, wherein the second particle has an association relationship with the first particle in the first list of events, association relationships corresponding to different first lists of events are different, and the particles are display objects of geometries.

Optionally, the association relationship comprises: an association relationship between a second attribute of the second particle and a first attribute of the first particle, the second attributes corresponding to different first lists of events are different, and/or first attributes corresponding to different first lists of events are different.

Optionally, the particle identifier writing module 201 is further configured to:

write the particle identifier of the first particle into the at least one first list of events in response to a preset condition being met, the preset condition comprising: an attribute of the first particle meeting a preset attribute condition, or a current time reaching a preset time period.

Optionally, the attribute of the first particle meeting the preset attribute condition comprises at least one of: a current display duration of the first particle reaching a maximum display duration of the first particle, a position of the first particle reaching a target position, a speed of the first particle reaching a target speed, color of the first particle being target color, or a size of the first particle reaching a target size.

Optionally, in the case that the first attribute and second attribute are both position, the second particle processing module 202 is further configured to:

read particle identifier of the first particle from the first list of events; read a particle identifier of the first particle from the first list of events; and obtain the effect screen by determining a position of the first particle according to the particle identifier of the first particle and displaying the second particle after the position of the first particle during a movement of the first particle during a movement of the first particle.

Optionally, a relative position between the second particle and the first particle changes over time by a change amount that is less than or equal to a first threshold.

Optionally, the first attribute comprises the current display duration, the maximum display duration and the position, and the second attribute comprises the position, and the second particle processing module 202 is further configured to:

read a particle identifier of the first particle from the first list of events; determine the current display duration, the maximum display duration and the position of the first particle according to the particle identifier of the first particle; and display at least one second particle around the position of the first particle in the case that current display time of the first particle is larger than the maximum display duration of the first particle.

Optionally, the at least one second particle forms a target shape, a position of the first particle being last displayed is a central position of the target shape, a size of the target shape gradually increases, and the at least one second particle is no longer displayed in the case that the size of the target shape increases to a target size.

Optionally, the maximum display duration of the second particle is less than or equal to a second threshold.

Optionally, the apparatus further comprises:

a cyclic processing module configured to, during processing the second particle, add the particle identifiers of the second particle into at least one remaining list of events to process a corresponding particle in the remaining list of events.

The effect processing apparatus provided in the present embodiment can be used to execute the technical solution of the above-mentioned method embodiment shown in FIG. 2. The implementation principles and technical effects of the effect processing apparatus are similar to those of the method embodiment and will not be detailed in the present embodiment.

Figure 8:
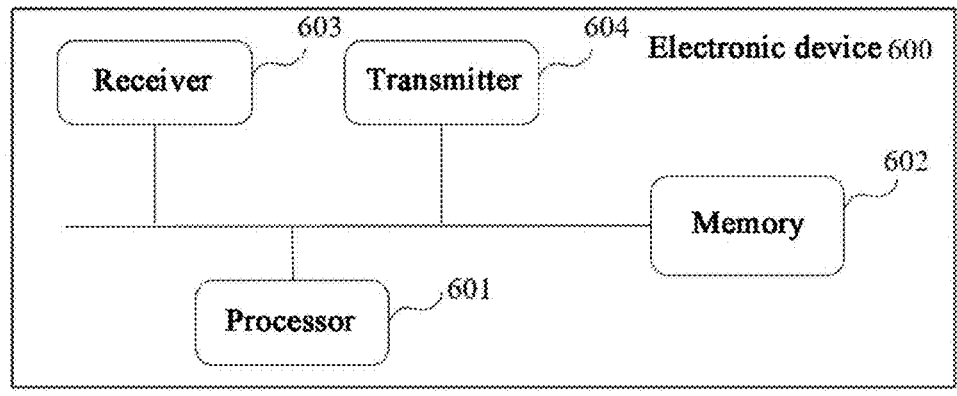
FIG. 8 is a block diagram of an electronic device provided by an embodiment of the present disclosure.

FIG. 8 is a block diagram of an electronic device 600 provided by an embodiment of the present disclosure. The electronic device 600 comprises a memory 602 and at least one processor 601.

The memory 602 stores computer-executed instructions therein.

The at least one processor 601 executes computer-implemented instructions stored in the memory 602 to cause the electronic device 601 to implement the effect processing method of FIG. 2.

In addition, the electronic device may further comprise a receiver 603 and a transmitter 604, wherein the receiver 603 is used for receiving information from remaining devices or apparatuses and forwarding the information to the processor 601, and the transmitter 604 is used for transmitting the information to the remaining devices or apparatuses.

Figure 9:
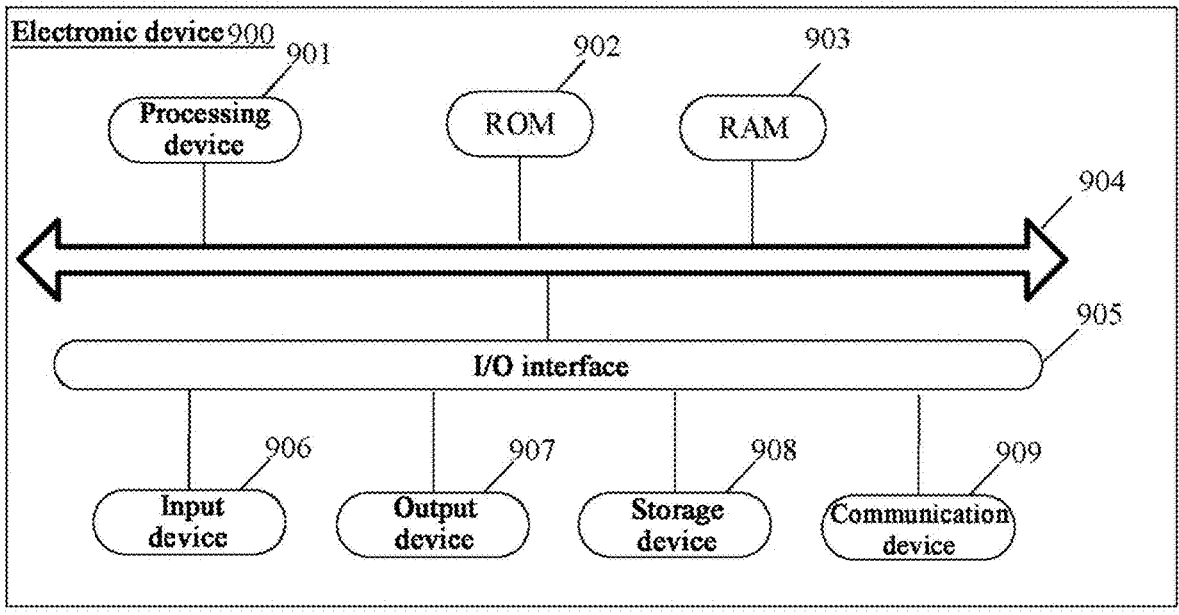
FIG. 9 is a block diagram of another electronic device provided by an embodiment of the present disclosure.

Furthermore, FIG. 9 shows a schematic structural diagram of an electronic device 900 according to an embodiment of the present disclosure. The electronic device 900 may be a terminal device. The terminal device may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 9 is merely an example and should not impose any limitations on the functionality and scope of use of embodiments of the present disclosure.

As shown in FIG. 9, the electronic device 900 may comprise a processing device (e.g., a central processing unit, a graph processor, etc.) 901 that may perform various suitable actions and processes in accordance with a program stored in a read only memory (ROM) 902 or a program loaded from a storage device 908 into a random access memory (RAM) 903. In the RAM 903, various programs and data needed by the operation of the electronic device 900 are also stored. The processing device 901, the ROM 902, and the RAM 903 are connected to each other via a bus 904. An input/output (I/O) interface 905 is also coupled to bus 904.

In general, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a speaker, a vibrator, etc.; a storage device 908 including, for example, a magnetic tape, a hard disk, etc.; and a communication device 909. The communication device 909 may allow the electronic device 900 to communicate in a wireless or wired manner with other devices to exchange data. Although FIG. 9 illustrates the electronic device 900 having various devices, it is to be understood that not all illustrated devices are required to be implemented or provided. More or fewer devices may optionally be implemented or provided.

In particular, the processes described above with reference to flow charts may be implemented as computer software programs in accordance with embodiments of the present disclosure. For example, embodiments of the present disclosure comprise a computer program product comprising a computer program carried on a computer-readable medium, the computer program comprising program code for performing the method illustrated by the flow charts. In such embodiments, the computer program may be downloaded and installed from a network via the communication device 909, or installed from the storage device 908, or installed from the ROM 902. When the computer program is executed by the processing device 901, the above-described functions defined in the method of the embodiments of the present disclosure are performed.

It is appreciated that the computer-readable medium described above in the present disclosure may be either a non-transitory computer-readable signal medium or a non-transitory computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

The computer readable medium may be contained in the above-described electronic device; it may also be present separately and not installed into the electronic device.

The computer readable medium carries one or more programs which, when executed by the electronic device, cause the electronic device to perform the method shown in the above embodiments.

The computer program code for carrying out operations of the present disclosure may be written in one or more programming languages or combinations thereof. The programming languages include, but not limited to, object-oriented programming languages, such as Java, Smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special-purpose hardware and computer instructions.

The units described in connection with the embodiments disclosed herein may be implemented in a software or hardware manner. The names of the units do not constitute limitations of the units themselves in a certain case. For example, the effect processing unit may further be described as "a unit for performing effect processing".

The functions described herein above may be performed, at least in part, by one or more hardware logic components.

For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

In a first example of the first aspect, embodiments of the present disclosure provide an effect processing method, comprising:

during processing of a first particle, writing a particle identifier of a first particle into at least one first list of events;

obtaining an effect screen by processing a corresponding second particle according to each first list of events, wherein the second particle has an association relationship with the first particle in the first list of events, association relationships corresponding to different first lists of events are different, and the particles are display objects of geometries.

Based on the first example of the first aspect, in a second example of the first aspect, the association relationship comprises: an association relationship between a second attribute of the second particle and a first attribute of the first particle, the second attributes corresponding to different first lists of events are different, and/or first attributes corresponding to different first lists of events are different.

Based on the second example of the first aspect, in a third example of the first aspect, writing the particle identifier of the first particle into the at least one first list of events comprises:

writing the particle identifier of the first particle into the at least one first list of events in response to a preset condition being met, the preset condition comprising: an attribute of the first particle meeting a preset attribute condition, or a current time reaching a preset time period.

Based on the third example of the first aspect, in a fourth example of the first aspect, the attribute of the first particle meeting the preset attribute condition comprises at least one of: a current display duration of the first particle reaching a maximum display duration of the first particle, a position of the first particle reaching a target position, a speed of the first particle reaching a target speed, color of the first particle being target color, or a size of the first particle reaching a target size.

Based on the fourth example of the first aspect, in a fifth example of the first aspect, in the case that the first attribute and second attribute are both position, the obtaining an effect screen by processing a corresponding second particle according to each first list of events comprises:

reading a particle identifier of the first particle from the first list of events; and obtaining the effect screen by determining a position of the first particle according to the particle identifier of the first particle and displaying the second particle after the position of the first particle during a movement of the first particle during a movement of the first particle.

Based on the fifth example of the first aspect, in a sixth example of the first aspect, a relative position between the second particle and the first particle changes over time by a change amount that is less than or equal to a first threshold.

Based on the fourth example of the first aspect, in a seventh example of the first aspect, wherein the first attribute comprises a current display duration, a maximum display duration and a position, the second attribute comprises a position, and obtaining the effect screen by processing the corresponding second particle according to each first list of events comprises:

reading a particle identifier of the first particle from the first list of events;

determining the current display duration, the maximum display duration and the position of the first particle according to the particle identifier of the first particle; and displaying at least one second particle around the position of the first particle in the case that current display time of the first particle is larger than the maximum display duration of the first particle.

Based on the seventh example of the first aspect, in an eighth example of the first aspect, the at least one second particle forms a target shape, a position of the first particle being last displayed is a central position of the target shape, a size of the target shape gradually increases, and the at least one second particle is no longer displayed in the case that the size of the target shape increases to a target size.

Based on any of examples 2-8 of the first aspect, in a ninth example of the first aspect, the maximum display duration of the second particle is less than or equal to a second threshold.

Based on the first example of the first aspect, in a tenth example of the first aspect, the method further comprises:

processing a corresponding particle according to a remaining list of events by adding the particle identifier of the second particle into at least one remaining list of events during processing the second particle.

In a first example of a second aspect, there is provided an effect processing apparatus, comprising:

a particle identifier writing module configured to, during processing of a first particle, write particle identifier of the first particle into at least one first list of events;

a second particle processing module configured to obtain an effect screen by processing a corresponding second particle according to each first list of events, wherein the second particle has an association relationship with the first particle in the first list of events, association relationships corresponding to different first lists of events are different, and the particles are display objects of geometries.

Based on the first example of the second aspect, in a second example of the second aspect, the association relationship comprises: an association relationship between a second attribute of the second particle and a first attribute of the first particle, the second attributes corresponding to different first lists of events are different, and/or first attributes corresponding to different first lists of events are different.

Based on the second example of the second aspect, in a third example of the second aspect, the particle identifier writing module is further configured to:

write the particle identifier of the first particle into the at least one first list of events in response to a preset condition being met, the preset condition comprising: an attribute of the first particle meeting a preset attribute condition, or a current time reaching a preset time period.

Based on the third example of the second aspect, in a fourth example of the second aspect, the attribute of the first particle meeting the preset attribute condition comprises at least one of: a current display duration of the first particle reaching a maximum display duration of the first particle, a position of the first particle reaching a target position, a speed of the first particle reaching a target speed, color of the first particle being target color, or a size of the first particle reaching a target size.

Based on the fourth example of the second aspect, in a fifth example of the second aspect, in the case that the first attribute and second attribute are both position, the second particle processing module is further configured to:

read a particle identifier of the first particle from the first list of events; and obtain the effect screen by determining a position of the first particle according to the particle identifier of the first particle and displaying the second particle after the position of the first particle during a movement of the first particle during a movement of the first particle.

Based on the fifth example of the second aspect, in a sixth example of the second aspect, a relative position between the second particle and the first particle changes over time by a change amount that is less than or equal to a first threshold.

Based on the fourth example of the second aspect, in a seventh example of the second aspect, when the first attribute comprises the current display duration, the maximum display duration and the position, the second attribute comprises the position, and the second particle processing module is further configured to:

read a particle identifier of the first particle from the first list of events; determine the current display duration, the maximum display duration and the position of the first particle according to the particle identifier of the first particle; and display at least one second particle around the position of the first particle in the case that current display time of the first particle is larger than the maximum display duration of the first particle.

Based on the seventh example of the second aspect, in an eighth example of the second aspect, the at least one second particle forms a target shape, a position of the first particle being last displayed is a central position of the target shape, a size of the target shape gradually increases, and the at least one second particle is no longer displayed in the case that the size of the target shape increases to a target size.

Based on any of the second to eighth of the second aspect, in ninth example of the second aspect, the maximum display duration of the second particle is less than or equal to a second threshold.

Based on the first example of the second aspect, in a tenth example of the second aspect, the apparatus further comprises:

a cyclic processing module configured to, during processing the second particle, add the particle identifiers of the second particle into at least one remaining list of events to process a corresponding particle in the remaining list of events.

In a third aspect, according to one or more embodiments of the present disclosure, there is provided an electronic device comprising: at least one processor and a memory;

the memory stores computer-executable instructions;

the at least one processor executes the computer-executable instructions stored in the memory, to cause the electronic device to implement the method of any of the examples of the first aspect.

In a fourth aspect, according to one or more embodiments of the present disclosure, there is provided a computer-readable storage medium, the computer-readable storage medium storing computer-executable instructions therein, the computer-executable instructions, when executed by a processor, causing a computing device to implement the method of any of examples of the first aspect.

In a fifth aspect, according to one or more embodiments of the present disclosure, there is provided a computer program for implementing the method of any of examples of the first aspect.

In a sixth aspect, according to one or more embodiments of the present disclosure, there is provided a computer program product comprising a computer program for implementing the method of any of examples of the first aspect.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also comprise other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. An effect processing method, comprising:

during processing of a first particle, writing a particle identifier of the first particle into a first list of events;

writing the particle identifier of the first particle into another first list of events, wherein the first list of events corresponds to a first effect, the other first list of events corresponds to a second effect, and the first effect is different from the second effect; and obtaining an effect screen by processing a corresponding second particle according to each first list of events, wherein the second particle has an association relationship with the first particle in the first list of events, association relationships corresponding to different first lists of events are different, and the particles are display objects of geometries, wherein obtaining the effect screen by processing the corresponding second particle according to each first list of events comprises:

displaying the first effect by displaying the second particle based on the association relationship between the second particle and the first particle in the first list of events; and displaying the second effect by displaying another second particle based on another association relationship between the other second particle and the first particle in the other first list of events.

2. The method according to claim 1, wherein the association relationship comprises: an association relationship between a second attribute of the second particle and a first attribute of the first particle, wherein a plurality of second attributes corresponding to a plurality of first lists of events are different from each other, or a plurality of first attributes corresponding to a plurality of first lists of events are different from each other.

3. The method according to claim 2, wherein writing the particle identifier of the first particle into the first list of events comprises:

writing the particle identifier of the first particle into the first list of events in response to a preset condition being met, the preset condition comprising: an attribute of the first particle meeting a preset attribute condition, or a current time reaching a preset time period.

4. The method according to claim 3, wherein the attribute of the first particle meeting the preset attribute condition comprises at least one of: a current display duration of the first particle reaching a maximum display duration of the first particle, a position of the first particle reaching a target position, a speed of the first particle reaching a target speed, color of the first particle being target color, or a size of the first particle reaching a target size.

5. The method according to claim 2, wherein in response to the first attribute and second attribute both being positions, obtaining the effect screen by processing the corresponding second particle according to each first list of events comprises:

reading the particle identifier of the first particle from the first list of events; and obtaining the effect screen by determining a position of the first particle according to the particle identifier of the first particle and displaying the second particle after the position of the first particle during a movement of the first particle.

6. The method according to claim 5, wherein a relative position between the second particle and the first particle changes over time by a change amount that is less than or equal to a first threshold.

7. The method according to claim 2, wherein the first attribute comprises a current display duration, a maximum display duration, and a position, the second attribute comprises a position, and obtaining the effect screen by processing the corresponding second particle according to each first list of events comprises:

reading the particle identifier of the first particle from the first list of events;

determining the current display duration, the maximum display duration, and the position of the first particle according to the particle identifier of the first particle; and displaying at least one second particle around the position of the first particle in response to a current display time of the first particle being larger than the maximum display duration of the first particle.

8. The method according to claim 7, wherein the at least one second particle forms a target shape, the position of the first particle being last displayed is a central position of the target shape, a size of the target shape gradually increases, and the at least one second particle is no longer displayed in the case that the size of the target shape increases to a target size.

9. The method according to claim 2, wherein a maximum display duration of the second particle is less than or equal to a second threshold.

10. The method according to claim 1, wherein the method further comprises:

processing a corresponding particle according to a remaining list of events by adding the particle identifier of the second particle into at least one remaining list of events during processing the second particle.

11. An electronic device, comprising: at least one processor and a memory;

the memory storing computer-executable instructions;

the at least one processor executing the computer-executable instructions stored in the memory, to cause the electronic device to:

during processing of a first particle, write a particle identifier of the first particle into a first list of events;

write the particle identifier of the first particle into another first list of events, wherein the first list of events corresponds to a first effect, the other first list of events corresponds to a second effect, and the first effect is different from the second effect; and obtain an effect screen by processing a corresponding second particle according to each first list of events, wherein the second particle has an association relationship with the first particle in the first list of events, association relationships corresponding to different first lists of events are different, and the particles are display objects of geometries, wherein the computer-executable instructions causing the electronic device to obtain the effect screen by processing the corresponding second particle according to each first list of events comprise computer-executable instructions causing the electronic device to:

display the first effect by displaying the second particle based on the association relationship between the second particle and the first particle in the first list of events; and display the second effect by displaying another second particle based on another association relationship between the other second particle and the first particle in the other first list of events.

12. A non-transitory computer-readable storage medium, wherein the computer-readable storage medium stores computer-executable instructions therein, the computer-executable instructions, when executed by a processor, causing a computing device to:

during processing of a first particle, write a particle identifier of the first particle into a first list of events;

write the particle identifier of the first particle into another first list of events, wherein the first list of events corresponds to a first effect, the other first list of events corresponds to a second effect, and the first effect is different from the second effect; and obtain an effect screen by processing a corresponding second particle according to each first list of events, wherein the second particle has an association relationship with the first particle in the first list of events, association relationships corresponding to different first lists of events are different, and the particles are display objects of geometries, wherein the computer-executable instructions causing the computing device to obtain the effect screen by processing the corresponding second particle according to each first list of events comprise computer-executable instructions causing the computing device to:

display the first effect by displaying the second particle based on the association relationship between the second particle and the first particle in the first list of events; and display the second effect by displaying another second particle based on another association relationship between the other second particle and the first particle in the other first list of events.

13. The device according to claim 11, wherein the association relationship comprises: an association relationship between a second attribute of the second particle and a first attribute of the first particle, and wherein a plurality of second attributes corresponding to a plurality of first lists of events are different from each other, or a plurality of first attributes corresponding to a plurality of first lists of events are different from each other.

14. The device according to claim 13, wherein the instructions to write the particle identifier of the first particle into the first list of events comprises instructions to:

write the particle identifier of the first particle into the first list of events in response to a preset condition being met, the preset condition comprising: an attribute of the first particle meeting a preset attribute condition, or a current time reaching a preset time period.

15. The device according to claim 14, wherein the attribute of the first particle meeting the preset attribute condition comprises at least one of: a current display duration of the first particle reaching a maximum display duration of the first particle, a position of the first particle reaching a target position, a speed of the first particle reaching a target speed, color of the first particle being target color, or a size of the first particle reaching a target size.

16. The device according to claim 13, wherein in response to the first attribute and second attribute both being positions, the instructions to obtain the effect screen by processing the corresponding second particle according to each first list of events comprises instructions to:

read the particle identifier of the first particle from the first list of events; and obtain the effect screen by determining a position of the first particle according to the particle identifier of the first particle and displaying the second particle after the position of the first particle during a movement of the first particle.

17. The device according to claim 16, wherein a relative position between the second particle and the first particle changes over time by a change amount that is less than or equal to a first threshold.

18. The device according to claim 13, wherein the first attribute comprises a current display duration, a maximum display duration, and a position, the second attribute comprises a position, and the instructions to obtain the effect screen by processing the corresponding second particle according to each first list of events comprises instructions to:

read the particle identifier of the first particle from the first list of events;

determine the current display duration, the maximum display duration, and the position of the first particle according to the particle identifier of the first particle; and display at least one second particle around the position of the first particle in response to a current display time of the first particle being larger than the maximum display duration of the first particle.

19. The device according to claim 18, wherein the at least one second particle forms a target shape, the position of the first particle being last displayed is a central position of the target shape, a size of the target shape gradually increases, and the at least one second particle is no longer displayed in response to the size of the target shape increasing to a target size.

20. The device according to claim 13, wherein a maximum display duration of the second particle is less than or equal to a second threshold.

* * * * *